(12) United States Patent
Matko et al.

(10) Patent No.: US 6,909,408 B2
(45) Date of Patent: Jun. 21, 2005

(54) MOUNTING ASSEMBLY FOR NIGHT VISION DISPLAY UNIT

(75) Inventors: Mark A. Matko, North Olmsted, OH (US); Craig S. Haehn, Avon Lake, OH (US); Duane R. Johnson, Wellington, OH (US)

(73) Assignee: Bendix Commercial Vehicle Systems LLC, Elyria, OH (US)

( * ) Notice: Subject to any disclaimer, the term of this patent is extended or adjusted under 35 U.S.C. 154(b) by 383 days.

(21) Appl. No.: 10/034,203

(22) Filed: Dec. 20, 2001

(65) Prior Publication Data

US 2004/0021618 A1 Feb. 5, 2004

(51) Int. Cl.$^7$ .................................................. G09G 5/00
(52) U.S. Cl. ........................ 345/7; 296/97.5; 296/97.2; 362/492; 362/142
(58) Field of Search ................................ 345/7–9, 903; 361/681–683; 362/492, 142, 135; 359/844, 872; 296/97.1, 97.2, 97.5, 97.12, 37.6, 37.7, 37.8, 97.6, 97.8, 97.9; 340/980; 248/917–924; D14/126, 132, 371, 374; D12/345, 415, 418

(56) References Cited

U.S. PATENT DOCUMENTS

| | | | | |
|---|---|---|---|---|
| 4,979,079 A | * | 12/1990 | Tawaraya | ................... 362/135 |
| 5,044,685 A | * | 9/1991 | Yang | ........................ 296/97.6 |
| 5,051,735 A | | 9/1991 | Furakawa | |
| 5,096,271 A | * | 3/1992 | Portman | ..................... 312/7.2 |
| 5,174,644 A | * | 12/1992 | Hermansson et al. | ....... 362/492 |
| 5,198,797 A | | 3/1993 | Daidoji | |
| 5,210,624 A | | 5/1993 | Matsumoto et al. | |
| 5,471,678 A | | 12/1995 | Dor | |
| 5,651,605 A | * | 7/1997 | Corn | .......................... 362/492 |
| 5,729,016 A | | 3/1998 | Klapper et al. | |
| 5,822,023 A | | 10/1998 | Suman et al. | |
| 5,927,792 A | * | 7/1999 | Welling et al. | ............. 296/97.5 |
| 5,975,708 A | * | 11/1999 | Fitzpatrick et al. | ......... 359/844 |
| 6,115,086 A | * | 9/2000 | Rosen | ......................... 348/837 |
| 6,125,030 A | * | 9/2000 | Mola et al. | .................. 361/681 |
| 6,256,078 B1 | * | 7/2001 | Ogata | .......................... 349/58 |
| D446,507 S | * | 8/2001 | Rosen et al. | ............... D14/132 |
| 6,364,390 B1 | * | 4/2002 | Finneman | .................. 296/37.7 |
| 6,409,242 B1 | * | 6/2002 | Chang | ........................ 296/37.7 |
| 2001/0048404 A1 | * | 12/2001 | Cook et al. | ..................... 345/7 |

FOREIGN PATENT DOCUMENTS

| | | |
|---|---|---|
| DE | 43 02 868 A1 | 2/1993 |
| DE | 197 39 352 A1 | 8/1997 |
| EP | 1 219 498 A1 | 3/2002 |
| FR | 2 730 334 | 8/1992 |

* cited by examiner

Primary Examiner—Lunyi Lao
(74) Attorney, Agent, or Firm—Calfee, Halter & Griswold LLP

(57) ABSTRACT

A mounting assembly for a night vision display unit uses friction hinges to effectively position the display unit at a desired position relative to the vehicle operator. In a dashboard mounting arrangement, the friction hinge dampens movement of the display unit. In the visor mounted arrangement, the friction hinge assembly and catch assembly ensure convenient, effective storage and deployment of the visor or display unit without one component adversely impacting on the operation and use of the other component.

9 Claims, 4 Drawing Sheets

MOUNTING ASSEMBLY FOR NIGHT VISION DISPLAY UNIT

BACKGROUND OF THE INVENTION

This application relates to a night vision system, and more particularly to a new assembly for mounting a display unit.

There is an increased desire to incorporate night vision systems into heavy vehicles such as trucks, buses, and tractors. The night vision system provides an alternative means of improving visibility under difficult driving conditions such as night-time driving, low or no-light conditions, etc. For example, an infrared camera provides an alternative forward view from the truck cab and the view is fed to a display unit such as a heads-up display. The display unit is preferably mounted in the vehicle or cab compartment in a manner so that the driver's view of the road through the windshield is not impaired. One common manner of mounting a display unit is to use a pair of brackets disposed on opposite sides of the display unit where the brackets are secured to the vehicle dashboard. This provides a convenient location so that the driver easily sees the display unit. The brackets orient the display at a fixed angle relative to the driver so that there is no variability of the display unit.

Another desired location to mount the display unit is from the interior headliner of the truck cab. Heretofore, this has been difficult because of the need to accommodate a visor, storage compartments, etc. The visor function cannot be compromised and the heads up display must not introduce sharp edges or protrusions which could injure the driver. Although a swing-down hinge assembly has been suggested, it must still allow the sun visor to be deployed. Moreover, the display unit must not inadvertently swing down in a manner that would either startle or potentially bother the driver.

Accordingly, an improved mounting assembly for a night vision display unit is desired in a vehicle compartment.

SUMMARY OF THE INVENTION

The preferred mounting assembly incorporates a friction hinge into the display unit that dampens movement of the display unit.

A preferred mounting assembly for the night vision display unit pivotally mounts the unit adjacent an upper region of a windshield. The display unit is movable between storage and deployed positions. Likewise, a visor is pivotally mounted in the vehicle compartment adjacent an upper region of the windshield. A catch secures at least one of the display unit and visor in its respective storage position.

A preferred catch assembly is a magnet mounted on a rear face of the display unit and a first striker or magnetically attractive member secured to the visor and a second striker mounted within the vehicle compartment. This allows the display unit to be maintained in a storage position when the visor is either in a deployed position or a storage position.

An existing truck cab can be easily modified to incorporate the night vision system. The display unit is hingedly secured within the compartment and incorporates a catch/magnet on the rear face thereof. The second part of the latch or striker is secured to the visor, as well as a second striker being secured to the headliner.

The present invention advantageously provides a simple, effective solution to the known problems.

The mounting assembly provides for effective adjustment of the desired orientation of the display unit.

The mounting assembly also advantageously provides for a heads-up display in the visor area without impinging on visor function.

The preferred mounting assembly also effectively stores the display unit during both the visor storage and deployed positions.

Still other advantages and benefits of the present invention will become apparent to those skilled in the art upon reading and understanding the following detailed description.

DETAILED DESCRIPTION OF THE PREFERRED EMBODIMENTS

Figure 1:
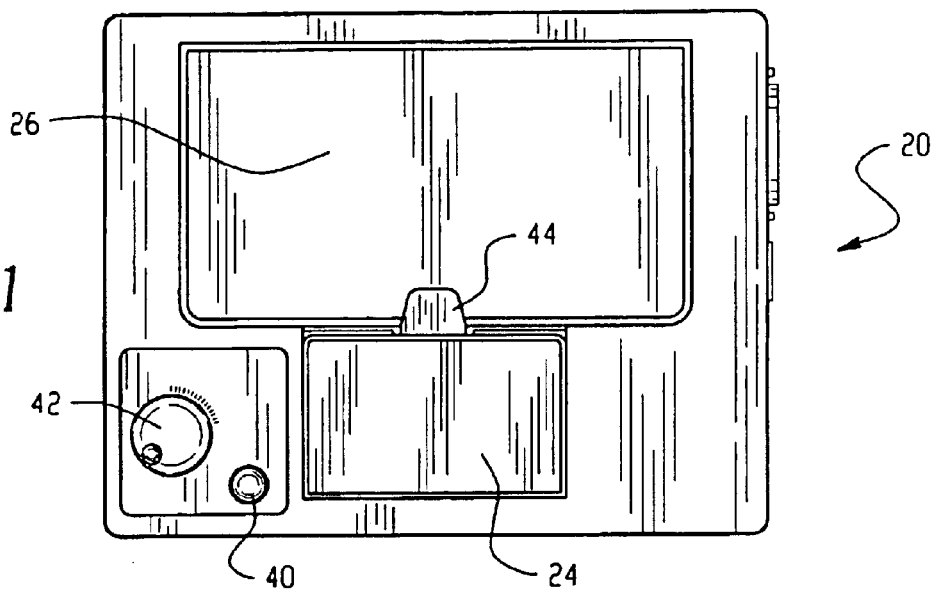
FIG. 1 is a top plan view of a night vision display unit.
Figure 2:
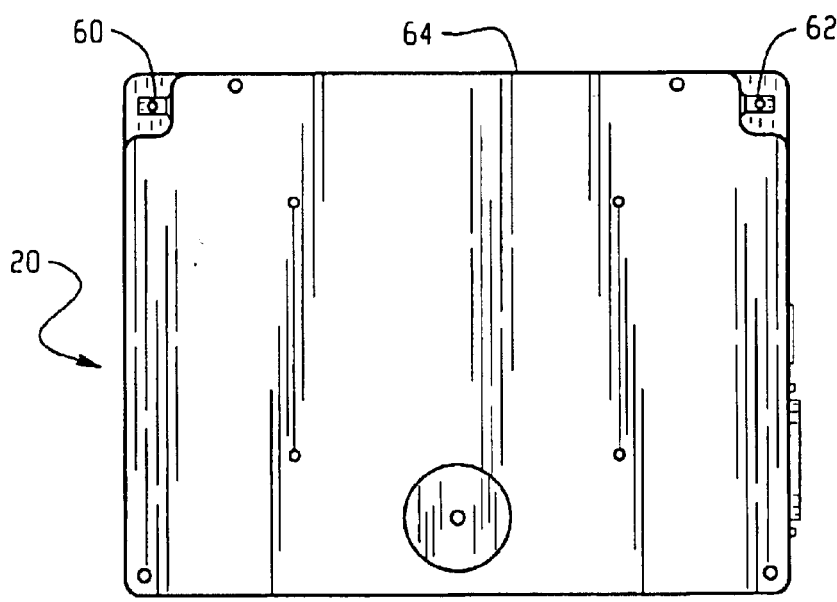
FIG. 2 is a rear plan view of the display unit of FIG. 1.
Figure 3:
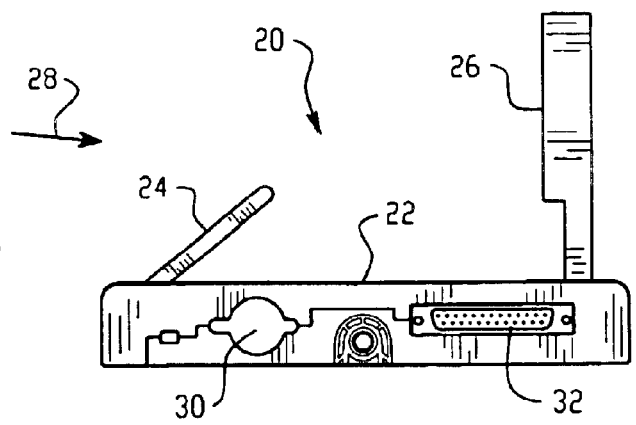
FIG. 3 is a side elevational view of the display unit in a deployed state.

FIGS. 1–3 illustrate a preferred form of a video display unit 20 associated with a night vision system. The display unit 20 is a generally thin, rectangular structure that includes a display surface 22 that is viewed by a vehicle operator via a pair of reflecting surfaces, namely, first fold mirror 24 and a second surface or combiner 26. The combiner has an aspherical surface to provide an augmented view of the display surface 22 as reflected from the first fold mirror 24. Thus, when viewed from the direction of the arrow 28 of FIG. 3, the image is viewed on the surface 22. A video input/output 30 or multi-pin input 32 provides a signal from a night vision camera (not shown) as displayed on screen 22. An on/off control knob 40 and an intensity control knob 42 are exemplary controls or switches that provide relatively simplified operation of the display unit. A deployment latch 44 selectively holds the mirror portions 24, 26 in a planar, folded storage position (FIG. 1) and when the latch is opened, the mirror surfaces 24, 26 can be deployed to the angled positions as illustrated in FIG. 3.

Figure 4:
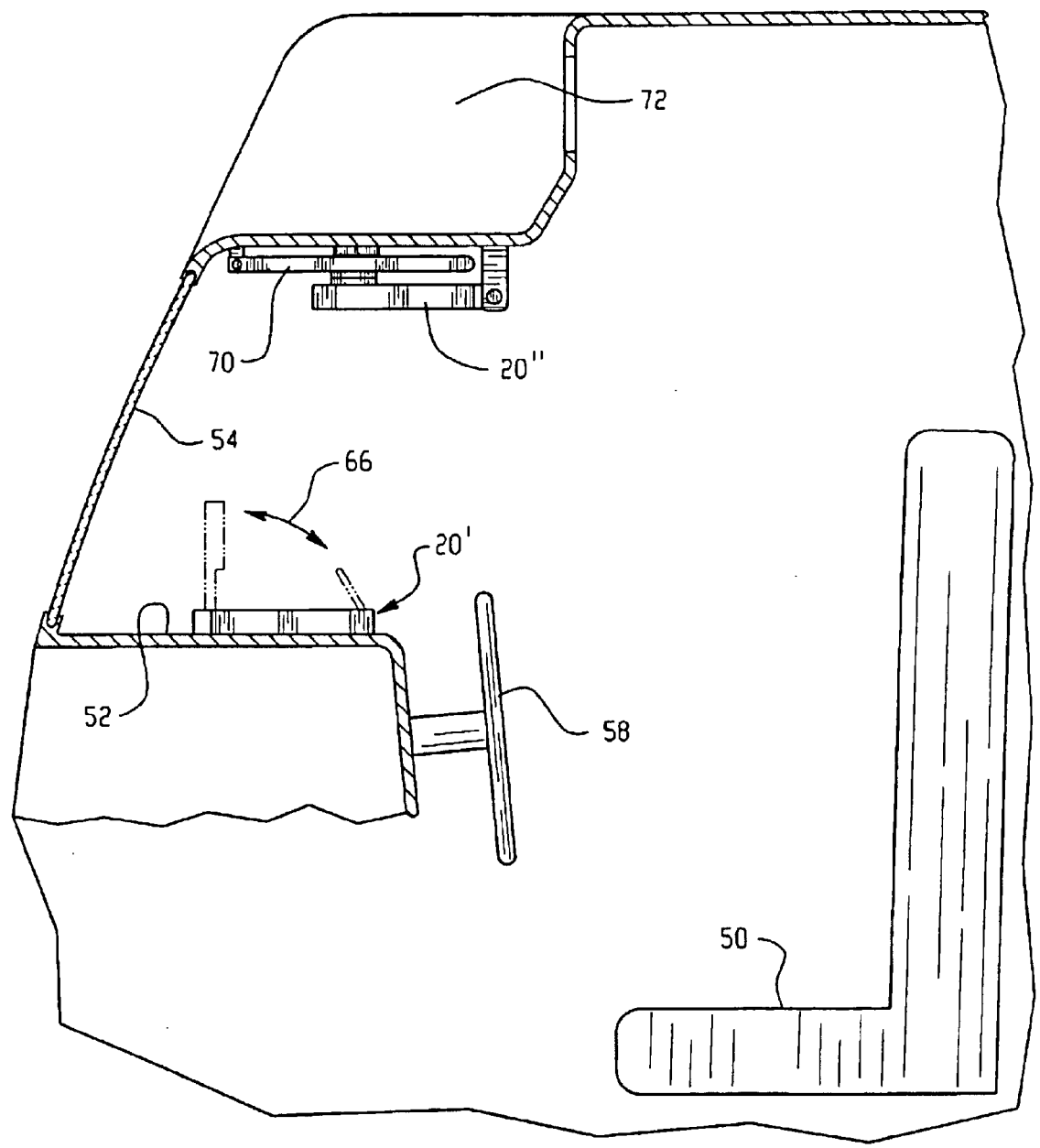
FIG. 4 is schematic representation of a vehicle compartment or truck cab illustrating mounting of the display unit.

FIG. 4 schematically represents the interior of a vehicle compartment such as a truck cab. Seat 50 positions the operator relative to the dashboard 52 to allow a clear, unobstructed view of the road ahead through windshield 54. In one embodiment, the display unit 20' of FIGS. 1–3 is mounted to the dashboard 52, a so-called heads down display (HDD). As represented in FIG. 2, first and second adjustable mounting components or friction hinges 60, 62, to be described in greater detail below, are provided on opposite sides of the display unit along a common edge 64. These mounting components secure opposite edges of the display unit to the dashboard. As represented by directional arrow 66 in FIG. 4, the display unit can be tilted through a predetermined range of movement, although in use the display unit will engage the dashboard and the reflective mirrors provide an effective heads down display.

Figure 5:
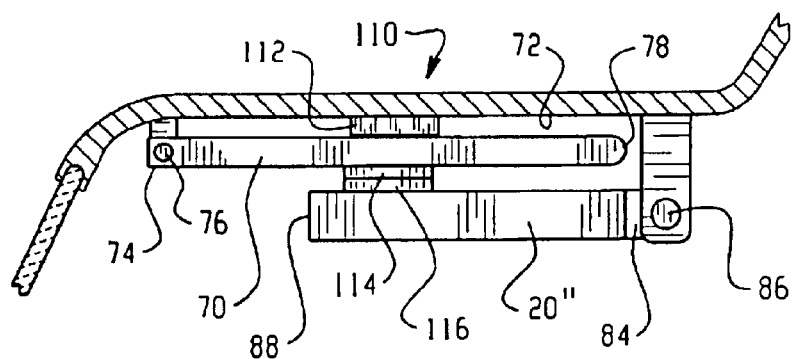
FIGS. 5–9 are a sequential series of schematic representations of the interaction between the visor and the display unit.

Alternatively, display unit 20" is mounted adjacent a sun visor 70 as also illustrated in FIG. 4 in a heads up display (HUD) format and shown in greater detail in FIGS. 5–9. In this embodiment, the visor 70 and display unit 20" are mounted adjacent the windshield 54, shown here as being hingedly or pivotally secured along one edge to the lower surface of a storage compartment 72 or headliner. As shown, either the visor or the display unit may be selectively deployed or stored. In FIG. 5, the visor 70 is secured along a first edge 74 to a pivot or hinge 76. A second or opposite edge 78 of the visor is free to be rotated or pivoted downwardly from its storage position of FIG. 5 to the deployed position of FIG. 8. The display unit 20" meanwhile is secured along a first edge 84 and mounted for rotational movement about a pivot or hinge 86. A second or opposite edge 88 is free to move through an arc about the hinge 86.

Figure 6:
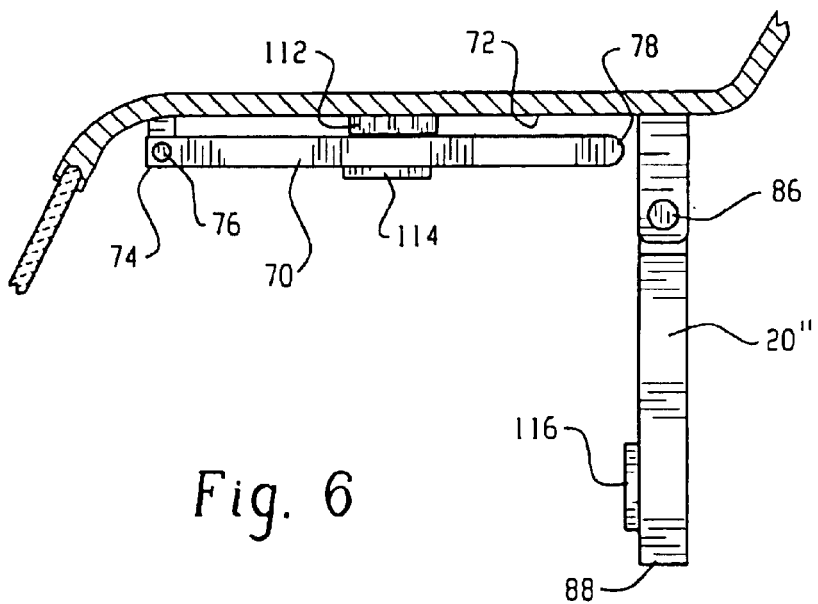

Thus, in FIG. 5, the visor and display are both maintained in substantially horizontal, storage positions. In FIG. 6, the display unit 20" is pivoted in a counterclockwise direction as illustrated to a generally vertical orientation. The display unit and night vision camera system provide for improved road visibility during low light conditions. Additionally, positioning the display unit in the region of the visor is preferred since it is a natural, ergonomic location that is easy for the operator to become accustomed to. During daylight operation, the display unit is easily rotated to the storage position of FIG. 5.

If it is desired to deploy or use the visor, the display unit 20" is first rotated to its position shown in FIG. 6. Subsequently, the visor edge 78 is rotated in a clockwise direction about the hinge 76 to a deployed position illustrated in FIG. 7. Thereafter, as is further illustrated by reference arrow 90 in FIG. 7, the display unit is rotated upwardly to the position shown in FIG. 8, i.e., its storage position. This conveniently moves the display unit 20" out of the way and allows the visor to be operated in conventional fashion as desired. These steps are merely reversed to orient the visor to the storage position of FIG. 5. That is, rotating the display unit downwardly to the position shown in FIG. 7, then rotating the visor upwardly to the position shown in FIG. 6, and further rotating the display unit upwardly orients both the visor and display unit in the storage positions shown in FIG. 5.

Figure 9:
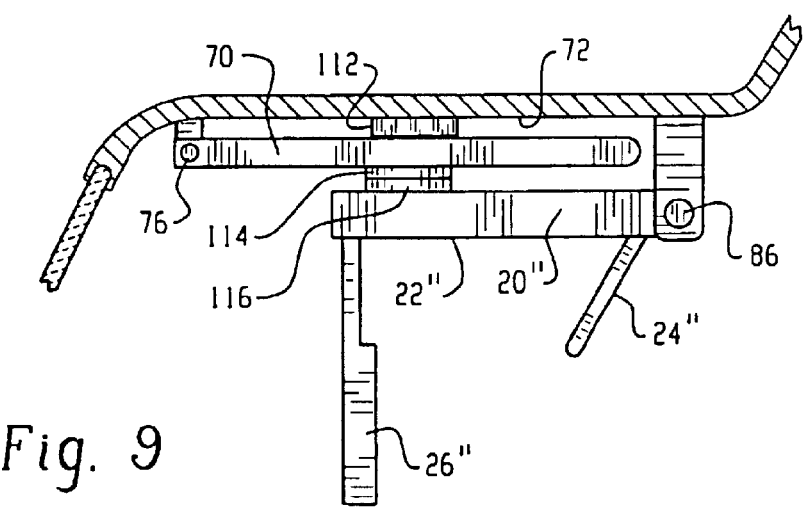

The display unit is easily used in the heads up fashion as illustrated in FIG. 9. The visor and the display unit are oriented in mating, horizontal positions. The display surface 22" is viewed with the assistance of the first fold mirror 24" and the combiner 26". The visor is latched in a horizontal position to the rear of the display unit so that the visor does not interfere with the heads up display.

Figure 10:
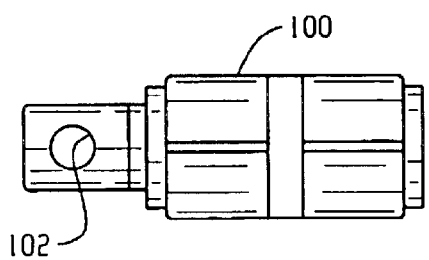
FIG. 10 is an enlarged view of a friction hinge.
Figure 11:
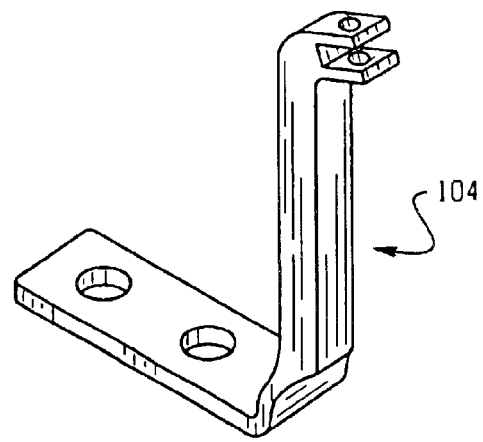
FIG. 11 is an isometric view of a hinge support.

FIGS. 10 and 11 illustrate a friction hinge and hinge support that finds particular use with the display unit of the present invention. The hinge 100 of FIG. 10 is secured with a fastener (not shown) through fastening opening 102. Thus, these friction hinges are secured at opposite sides of the display unit (20' or 20") along one edge and cooperate with the hinge supports 104 of FIG. 11 to secure the display unit 20' to the dashboard, or display unit 20" along a lower surface of a storage compartment, headliner, or generally horizontal surface within the truck cab.

Since the display unit has a predetermined weight and will be subjected to the vibration and the rigors of road travel, a catch assembly 110 is provided. In the preferred arrangement, the catch assembly includes first and second strikers or catch plates 112, 114 secured to the headliner 72 and first or inner face of the visor 70, respectively. For example, the strikers or catch plates are formed of a ferrous material that cooperates with a catch member or magnet 116 mounted to a rear face of the display unit. As best illustrated in FIG. 5, magnet 116 is magnetically engaged to the striker plate 114 on the visor. Since the hinges 76, 86 of the visor and display unit, respectively, are located in spaced locations, this structural arrangement advantageously retains the visor and the display unit in their storage positions. A downwardly imposed force of sufficient magnitude to overcome the magnetic force allows the display unit to be swung downwardly as shown in FIG. 6. The visor is sufficiently lightweight that it will not inadvertently fall within or obstruct the driver's view through the windshield.

Figure 7:
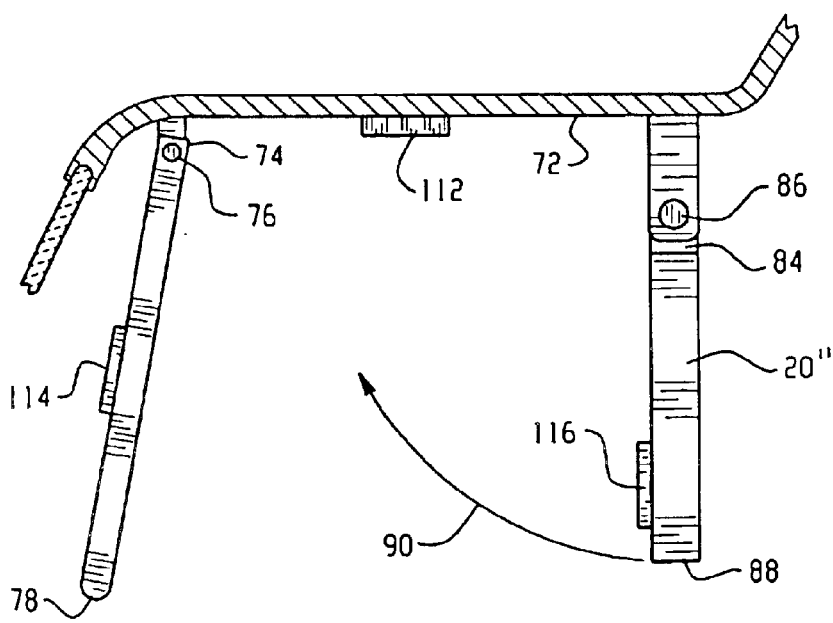
Figure 8:
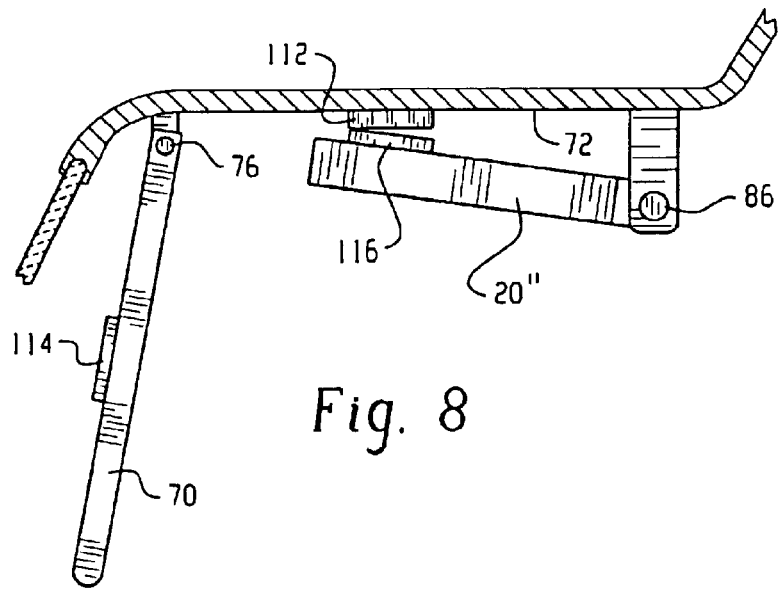

When the visor is deployed as shown in FIGS. 7 and 8, the display unit is then rotated upwardly to a generally horizontal stored position. There, the catch magnet 116 on the rear face of the display unit engages the striker plate 112 on the headliner. This assures that the display unit is maintained in the stored position and does not interfere with the driver's view of the road while simultaneously allowing the visor to be fully functional as desired.

Thus, the friction hinge of the present invention allows the display unit 20' to be conveniently secured to the dashboard for selective orientation through a limited angle as illustrated by reference arrow 64. The friction hinge imposes sufficient force so that once the display unit is located at the desired angle it will dampen any further movement. Similarly, if the display unit is alternatively mounted to the headliner, the friction hinge and catch assembly 110 assure that the display unit remains in its storage position with the visor (FIG. 5) or maintained in a storage position when the visor is deployed (FIG. 8). This cooperation between the visor and display unit is easily adapted to a truck cab and does not adversely impact the conventional function or use of a visor, nor adversely impact the operation of the display unit.

The invention has been described with reference to the preferred embodiments. Obviously, modifications and alterations will occur to others upon reading and understanding the preceding detailed description. For example, the preceding specification refers to a magnet and striker/catch plate assembly for retaining the visor and display unit in desired positions. Other catch assemblies can be used with equal success and without departing from the scope and intent of the present invention. Likewise, a catch assembly can be used with the heads down display 20' of FIG. 4 to secure the display unit against the dashboard. If the catch assembly is inadvertently released, the provision of the friction hinge dampens potential movement of the display unit and precludes free-swinging movement that could startle the operator. It will also be appreciated that the magnet/catch assembly can be mounted at various locations on the display unit, vehicle cab, etc. The illustrated locations are merely representative of the function and operation of the invention. It is intended that the invention be construed as including all such modifications and alterations in so far as they come within the scope of the appended claims or the equivalents thereof.

Having thus described the present invention, it is now claimed:

1. A mounting assembly for a night vision display unit in a vehicle compartment, the mounting assembly comprising:

a visor pivotally mounted in the associated vehicle compartment position adjacent an upper region of an associated windshield, the visor movable between a storage position and a use position;

a display unit pivotally mounted in the associated vehicle compartment position adjacent an upper region of an associated windshield, the display unit movable between a storage position and a deployed position;

a first catch for securing at least one of the display unit and visor in their respective storage positions; and a second catch for securing the display unit in the storage position when the visor is deployed wherein said display pivots towards said visor such that when said visor is in said storage position and said display is in said storage position, the display captures the visor between the display and a portion of said associated vehicle compartment.

2. The mounting assembly of claim 1 wherein the first catch includes a magnet disposed on one of the visor and the display unit, and a striker mounted on the other of the visor and display unit.

3. A mounting assembly for a night vision display unit in a vehicle compartment, the mounting assembly comprising:

a visor pivotally mounted in the associated vehicle compartment position adjacent an upper region of an associated windshield, the visor movable between a storage position and a use position;

a display unit pivotally mounted in the associated vehicle compartment position adjacent an upper region of an associated windshield, the display unit movable between a storage position and a deployed position; and a first catch for securing at least one of the display unit and visor in their respective storage positions; wherein the first catch includes a magnet disposed on one of the visor and the display unit, and a striker mounted on the other of the visor and display unit; wherein the striker is mounted in the vehicle compartment for securing the display unit in a storage position when the visor is in a use position wherein said display pivots towards said visor such that when said visor is in said storage position and said display is in said storage position, the display captures the visor between the display and a portion of said associated vehicle compartment.

4. The mounting assembly of claim 1 wherein the visor includes a hinge along one edge disposed adjacent the windshield.

5. The mounting assembly of claim 4 wherein the display unit includes a hinge along one edge disposed in spaced relation from the windshield.

6. A mounting assembly for a night vision display unit in a vehicle compartment, the mounting assembly comprising:

a visor pivotally mounted in the associated vehicle compartment position adjacent an upper region of an associated windshield, the visor movable between a storage position and a use position;

a display unit pivotally mounted in the associated vehicle compartment position adjacent an upper region of an associated windshield, the display unit movable between a storage position and a deployed position; and a first catch for securing at least one of the display unit and visor in their respective storage positions; wherein the first catch includes a magnet secured to one face of the display unit opposite a display face of the display unit wherein said display pivots towards said visor such that when said visor is in said storage position and said display is in said storage position, the display captures the visor between the display and a portion of said associated vehicle compartment.

7. The mounting assembly of claim 6 wherein the visor includes a striker secured to a first face of the visor that faces outwardly when the visor is disposed in the storage position.

8. The mounting assembly of claim 6 wherein the display unit includes a friction hinge that dampens the display unit in a desired orientation between the storage and deployed positions.

9. The mounting assembly of claim 1 further comprising a friction hinge that dampens movement of the display unit.

* * * * *